(12) United States Patent
Agulnik et al.

(10) Patent No.: US 9,021,561 B2
(45) Date of Patent: Apr. 28, 2015

(54) METHOD OF PROVIDING A MIXED GROUP COMMUNICATION SESSION

(75) Inventors: Anatoly Agulnik, Deerfield, IL (US);
Michelle Antonelli, Barrington, IL (US);
Robert A Fredericks, Carol Stream, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1416 days.

(21) Appl. No.: 12/212,140

(22) Filed: Sep. 17, 2008

(65) Prior Publication Data
US 2010/0071027 A1  Mar. 18, 2010

(51) Int. Cl.
*G06F 7/04* (2006.01)
*H04L 29/06* (2006.01)
*H04W 12/08* (2009.01)

(52) U.S. Cl.
CPC .............. *H04L 63/104* (2013.01); *H04W 12/08* (2013.01); *H04L 65/4061* (2013.01); *H04L 65/1016* (2013.01)

(58) Field of Classification Search
CPC ... H04L 63/08; H04L 63/083; H04L 63/0815; H04L 63/0823; G06F 21/31
USPC .............. 726/1, 5, 6, 7, 19; 455/518; 709/223
See application file for complete search history.

(56) References Cited

U.S. PATENT DOCUMENTS

| | | | | |
|---|---|---|---|---|
| 5,838,905 A * | 11/1998 | Leigh | ........................... | 709/201 |
| 6,931,114 B1 * | 8/2005 | Martin | ..................... | 379/203.01 |
| 7,853,881 B1 * | 12/2010 | Aly Assal et al. | ............ | 715/734 |
| 8,099,120 B2 | 1/2012 | Drozt et al. | | |
| 2003/0084282 A1 * | 5/2003 | Taruguchi | ..................... | 713/155 |
| 2005/0128997 A1 * | 6/2005 | Zhao et al. | ..................... | 370/349 |
| 2006/0111135 A1 | 5/2006 | Gray | | |
| 2006/0140200 A1 | 6/2006 | Black | | |
| 2006/0141981 A1 | 6/2006 | Lin | | |
| 2006/0235981 A1 * | 10/2006 | Westman et al. | ............. | 709/227 |
| 2007/0016492 A1 | 1/2007 | Linker | | |
| 2007/0271346 A1 | 11/2007 | Vill | | |
| 2007/0282987 A1 * | 12/2007 | Fischer et al. | ................. | 709/223 |
| 2008/0004964 A1 * | 1/2008 | Messa et al. | ..................... | 705/17 |
| 2008/0034040 A1 * | 2/2008 | Wherry et al. | ................. | 709/204 |
| 2008/0052778 A1 * | 2/2008 | Narusawa et al. | ............... | 726/19 |
| 2008/0114987 A1 * | 5/2008 | Morris et al. | ................. | 713/183 |
| 2009/0292814 A1 * | 11/2009 | Ting et al. | ..................... | 709/229 |
| 2011/0296041 A1 * | 12/2011 | Jansson et al. | ................ | 709/228 |

OTHER PUBLICATIONS

International Preliminary Report on Patentability and Written Opinion for International Patent Application No. PCT/US2009/052636 mailed on Mar. 31, 2011.

* cited by examiner

*Primary Examiner* — Abu Sholeman
(74) *Attorney, Agent, or Firm* — Steven A. May

(57) ABSTRACT

A method of providing a mixed group communication session for a mixed group containing protected users and a guest user is provided. The method uses a secure server to assign temporary Identities (IDs) to the protected users. The secure server forms a mixed group session containing desired participants from among the protected users and the guest user. The secure server provides limited group rights to the guest user in the mixed group session. During the mixed group session, the secure server uses the permanent IDs of the protected users towards other protected users and temporary IDs of the permanent users towards the guest user. Also provided is a method for providing a mixed group communication session for a mixed group containing protected users and a guest user, wherein temporary IDs are assigned to protected users and the guest user.

25 Claims, 6 Drawing Sheets

METHOD OF PROVIDING A MIXED GROUP COMMUNICATION SESSION

TECHNICAL FIELD

The technical field relates generally to communication systems and especially to conducting mixed group communication sessions in communication systems.

BACKGROUND

The development of Public Safety (PS) communication systems has resulted in a number of features for PS systems that are not seen in commercial operations. PS users often face situations that are entirely different from that of the user of typical communication systems. Police, firefighters, military users and other PS organizations face life-threatening situations in which reliable communications may be mission critical, and reliability consistent through severe environmental and operations stresses. Security is also a major concern, as it is desirable for PS systems to be able to operate free of intruders or, often, of unauthorized reception. Most PS systems currently in use are Push-To-Talk (PTT) systems employing any of a number of radio-based digital technologies.

PS organizations benefit from enhanced communication among specific groups, such as, for example, a particular sub-unit within a police department. Communication groups can be created to establish and maintain such groups, generally at the level of the PTT server. Typically, however, the procedures for setting up such groups are somewhat inflexible, so that communication groups tend to be static entities in practice. Security is one issue in the procedures for establishing and maintaining such groups, as group integrity may depend on ensuring that group sessions are available only to group members.

A number of situations arise in which it would be advantageous to include participants from outside the normal group, on a limited basis. For example, a police investigation could benefit from including a medical support person in specific communications about the investigation. Technological advances have enabled this sort of inclusion, as the PS communication server can interface with broadband or common solutions such as Open Mobile Alliance PTT over Cellular (OMA PoC), or similar, widely-used systems.

However, inclusion of participants from outside the normal group (hereinafter referred to as guest users) also presents an increased challenge related to security concerns. While a guest user may know the identity of the PS direct contact, the identities of other PS users may not be information desirable to pass to the guest user. Similarly, communications protocols, passwords, and other communication details are not information that should be shared outside the PS user community. Overcoming these concerns in a way that preserves communications security is a time-consuming process. By the time the security procedures can be completed, the desirability of communicating with the guest user may have disappeared.

To date, despite the desirability of including guest users on PS systems, security procedures have prevented the development of systems that can provide for that capability.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
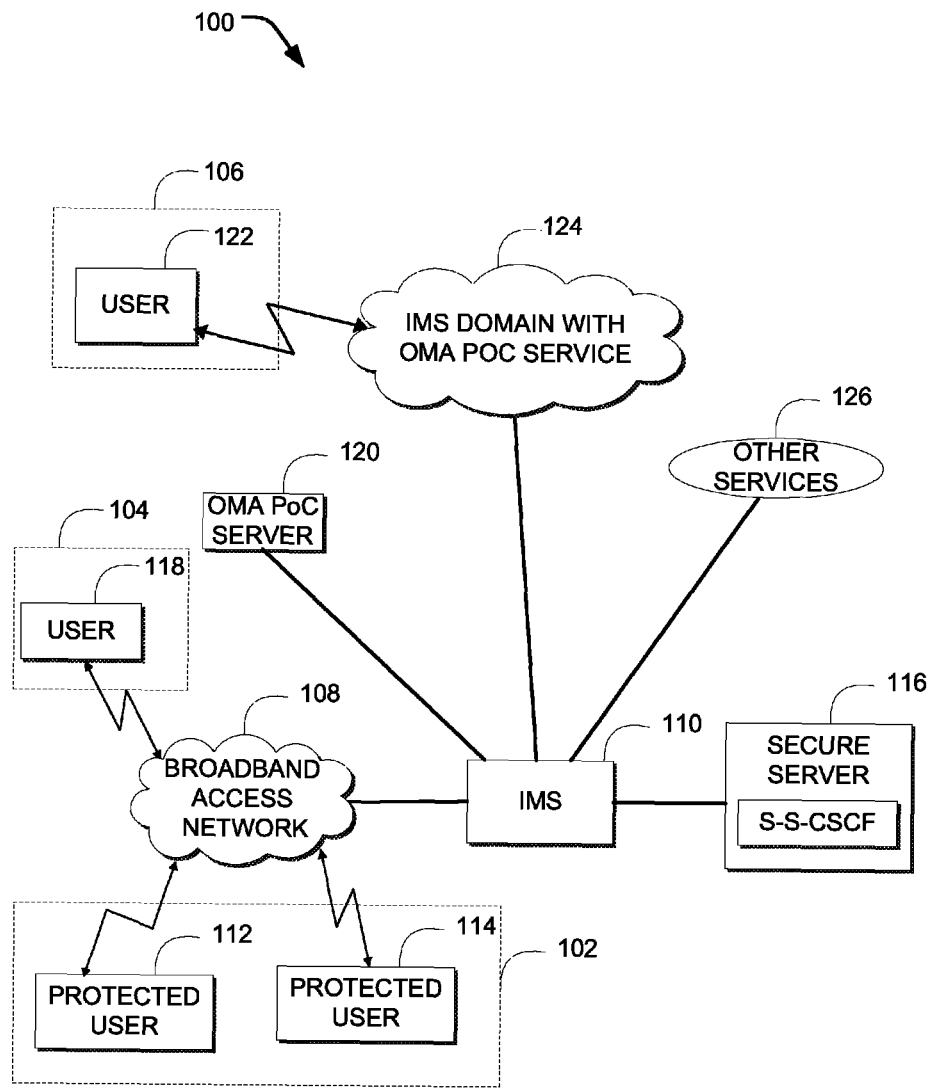
FIG. 1 illustrates an exemplary communication network for providing a mixed group communication session.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Before describing in detail embodiments that are in accordance with the present invention, it should be observed that the embodiments reside primarily in combinations of method steps and apparatus components related to provide security for user and group identities (IDs) for a mixed group communication. Accordingly, the apparatus components and method steps have been represented where appropriate by conventional symbols in the drawings, showing only those specific details that are pertinent to understanding the embodiments of the claimed invention so as not to obscure the disclosure with details that will be readily apparent to those of ordinary skill in the art having the benefit of the description herein.

Generally, described herein is a method that provides a mixed group communication session, among protected users and one or more guest users. The group members are assigned temporary IDs, if desired, which are mapped to their permanent IDs. The guest user is assigned limited group rights, so that IDs of protected users are provided to the guest user under the control of protected users or the system, irrespective of the desires of the guest user. More specifically, either a central controller or one of the participants of the mixed group (an authorized user) is able to selectively choose which participants of a session will be able to see the permanent ID of a particular user and which participants will not (thus seeing the temporary ID). The central controller or authorized user is thus able to grant privacy for other participants by controlling the presentation of IDs to various session participants. To further respect this privacy, in some embodiments a user who is not provided with the ID of another user will not be able to address the other user in the future.

Variations and alternate embodiments are provided that tailor the method to particular situations. For example, the guest user can be provided only the temporary IDs of the protected users, or, if desired, some of the permanent IDs of the protected users or other guest users could be shared with the guest user. Guest user rights can be defined to include which permanent IDs are to be provided to the guest user, as well as details such as a set expiration point for guest user rights. Other variations are set out below, with the understanding that such descriptions are illustrative in nature, the scope of the invention be solely defined by the claims appended hereto.

As used in this specification, the following terms are defined as follows. "Secure," used in connection with a communication system, server or the like, means a protected, or secure, environment or system operated by an organization needing a high degree of reliable, protected communication. Although those terms fit Public Safety (PS) organizations, the principles of the claimed invention extend beyond the PS environment. "Protected User" is a permanent member of a secure group, generally cleared for stated access and communication rights in that group. Two or more protected users form a "secure communication group." The secure communication group may be, for example, a PS or a government group, such as a police, fire, emergency medical, or military network. The secure communication group is serviced by one or more networks including a broadband network (on which a large number of users are present) and/or a limited access communication network (on which only a limited number of authorized users are permitted).

Any user other than the protected users, who is not a permanent member of the secure group, is referred to as a "Guest User." The guest user may be a member of a different secure group or, for PS networks, a Push-To-Talk over Cellular (PoC) user on a broadband network, who is using standard Open Mobile Alliance (OMA) PoC client and is served by standard OMA PoC servers. The guest user may be located in the same broadband network where the PS users are or in different foreign OMA PoC domains.

A "mixed group" is a communication group containing protected users and guest users. Subsequent PoC communication among the desired participants from among the protected users and the guest users in the mixed group is known as "mixed group communication".

FIG. 1 illustrates an exemplary communication network 100 for the implementation of some embodiments of the claimed invention. The communication network 100, for example, includes a secure communication group 102, a first OMA PoC communication group 104, and a second OMA PoC communication group 106. The secure communication group 102 is directly connected to the first OMA PoC communication group 104 and the second OMA PoC communication group 106 by way of a broadband access network 108 and an Internet Protocol Multimedia Subsystem (IMS) 110. It will be readily appreciated by those of ordinary skill in the art that the communication network 100 in accordance with the claimed invention can alternatively comprise any packetized communication network, such as networks utilizing packet data protocols like GPRS (General Packet Radio Service) and EGPRS (Enhanced GPRS). The communication network 100 may partly include a packetized communication sub-network.

The secure communication group 102 includes a protected user 112 and another protected user 114. Although only two protected users are shown for the sake of simplicity, it is readily apparent that there can be more protected users. A secure server 116 facilitates communication among the protected user 112 and the protected user 114. An optimized, secure server 116 is used to provide PS service to the protected users 112 and 114. The secure server 116 includes an integrated specialized, Secure Serving-Call Session Control Function (Secure-S-CSCF), which may implement a Session Initiation Protocol (SIP), and may also perform session control.

The first OMA PoC group 104 includes a user 118 connected to an OMA PoC server 120 by way of the broadband access network 108 and the IMS 110. The second OMA PoC group 106 includes a user 122 connected to an IMS domain with OMA PoC service 124. The secure server 116 and the OMA PoC server 120 can be implemented on the same machine.

Any user who is not a permanent member of the secure communication group 102, such as the user 118 or the user 122, is a guest user for the secure communication group 102. A mixed group is formed when a guest user is temporarily added to the secure communication group 102. The protected users and the guest users can access other services 126 by way of the broadband access network 108 and the IMS 110. The other services 126 include, but are not limited to OMA presence, 1-1 full duplex VoIP telephony, or OMA PoC PTT in a non-mixed group.

Figure 2:
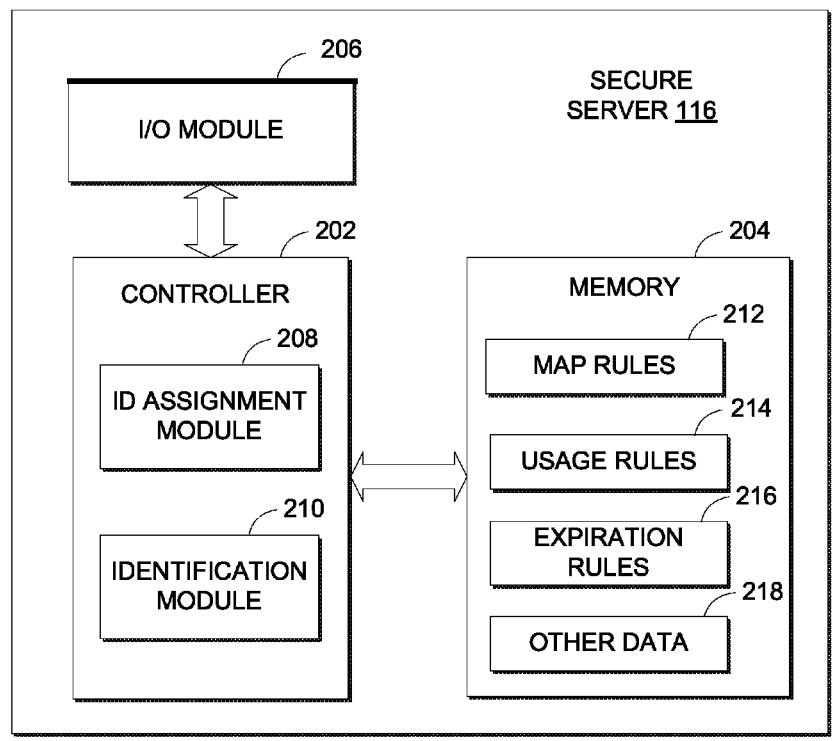
FIG. 2 illustrates an embodiment of a secure server that provides a mixed group communication session.

Referring to FIG. 2, the secure server 116 in accordance with one embodiment of the claimed invention is shown in more detail. The secure server 116 of the communication network 100 includes a controller 202, a memory 204, and an Input/output (I/O) module 206. The I/O module 206 enables the secure server 116 to communicate among the participating users of a secure communication group through an IP core (not shown in FIG. 2).

The controller 202 includes an Identity (ID) assignment module 208 and an identification module 210. The ID assignment module 208 assigns temporary IDs corresponding to permanent IDs of protected users engaged in mixed group communication with guest users. The ID assignment module 208 assigns the temporary IDs for the protected users based on a predefined set of rules, which may be set in the controller 202 or by one of the protected users as described below. During a mixed group communication, the controller 202 uses the temporary IDs of the protected users for communications with the guest users and the OMA PoC servers. The identification module 210 is configured to identify desired participants in the mixed group from among protected users, the guest users, and group parameters in the mixed group. In some embodiments, the temporary ID is provided to selected users automatically by the server 116 without having to be manually requested by the users. It would be apparent to those skilled in the art that the group parameters are factors, such as duration of the mixed group, roles of users participating in the mixed group.

The memory 204 is operatively coupled with the I/O module 206 and the controller 202. The memory 204 is configured to store map rules 212, usage rules 214, expiration rules 216, and other data 218. The other data 218 includes, but not restricted to, Secure-S-CSCF and network policies.

The map rules 212 define the mapping of temporary IDs to permanent IDs of the protected users. The map rules 212 constrain the assignment of temporary IDs to the corresponding permanent IDs of the protected users. The secure server 116 may retain the mapping between temporary IDs assigned to a protected user and the protected user's permanent ID (or temporary group ID and the protected user's permanent group ID) for a specified period of time after a mixed group communication session has ended or terminate this mapping when the session terminates. The time period may be defined by factors, such as constraints specified in the request as an additional parameter, preferences of the protected user, protected user's agency policy, and constraints set by an authorized protected user or leader to a group of protected users. It would be readily appreciated by one skilled in the art that the secure server 116 may also store mappings for temporary IDs assigned corresponding to permanent IDs of guest users. The mapping may be changed for each session, after a predetermined number of sessions, or be retained until the protected user or authorized protected user desires it to be changed. The mapping may be random or predetermined by the secure server 116.

The usage rules 214 define the manner in which communication among participating members of the mixed group is conducted. The usage rules 214 limits use of the temporary ID during a mixed group communication session among protected users and guest users. The usage rules 214 define a set of limited rights being assigned to guest users of the secure communication group.

The expiration rules 216 prevents use of the temporary ID by the guest users to contact the protected users after a predetermined event has occurred, such as a set number of uses having occurred or an expiration time has been reached. Mapping between a temporary ID and a permanent ID of a protected user and/or guest user is removed based on the expiration rules 216. The expiration rules 216 may be preset in the server 116 or may be configurable by a requesting protected user. The expiration rules 216 may be the same or unique for each guest user.

Figure 3:
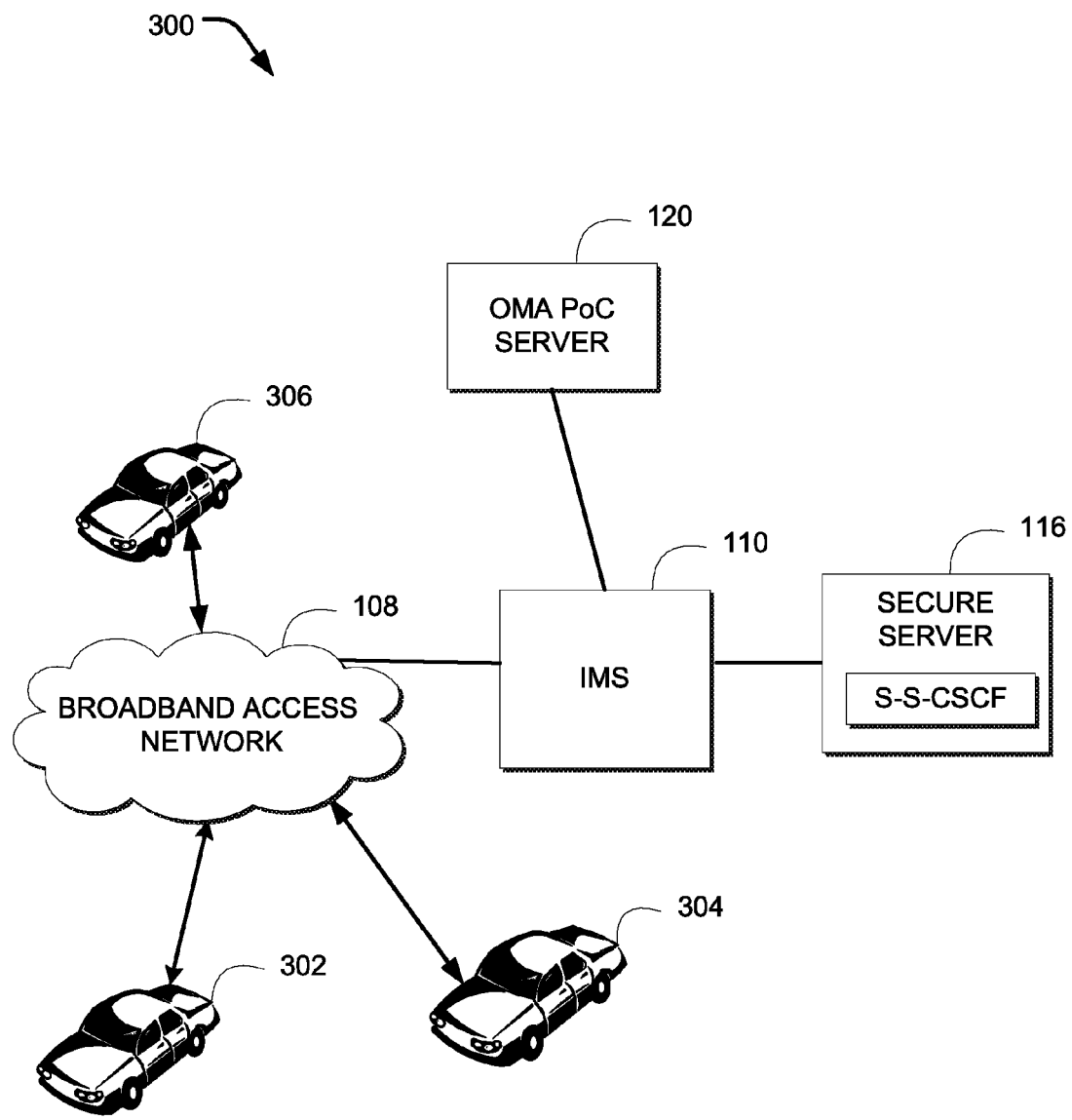
FIG. 3 illustrates an embodiment of a communication network that provides a mixed group communication session.

FIG. 3 illustrates a communication network 300 that provides a mixed group communication session. The communication network 300 illustrates an exemplary application of the claimed invention in the context of a protected user 302 wishing to contact a guest user 304. In one example, the protected user 302 is an on-duty police officer and the guest user 304 a medical technician. The on-duty police officer 302 contacts the secure server 116 to set up a PoC session among the on-duty police officer 302 and the medical technician 304. On receiving a request to setup the PoC session, the secure server 116 assigns a temporary ID to the on-duty police officer 302. The secure server 116 then communicates request for service using temporary ID of the on-duty police officer 302, over the communication network 300, to the OMA PoC server 120 local to the medical technician 304. It will be apparent to those of ordinary skill in the art that the on-duty police officer 302 is connected to the medical technician 304 by way of the broadband access network 108 and the IMS 110. The OMA PoC server 120 and the medical technician 304 receive an ID of the on-duty police officer 302. The ID may be a temporary ID or a permanent ID, as specified by the on-duty police officer 302 or group policies in the server 116.

The on-duty police officer 302 can thus use the temporary ID to contact the medical technician 304 without disclosing his/her permanent ID. The medical technician 304 can conditionally use his/her temporary ID to communicate back to the on-duty police officer 302 for a time dependent on the various conditions set by the police officer 302 or server 116. The temporary ID is temporary, as is the nature of relationship between the on-duty police officer 302 and the medical technician 304. As such the temporary ID can be set to expire after a given time, or after a certain number of uses, for example. The end result is that the on-duty police officer 302 is now able to safely communicate with the medical technician 304, because the permanent ID of the on-duty police officer 302 is revealed neither to the medical technician 304 nor to the OMA PoC server 120 of the medical technician 304. Similarly, the medical technician 304 is able to communicate with the on-duty police officer 302 using his/her permanent or temporary ID dependent on the usage rules.

On the other hand, if the on-duty police officer 302 wishes to communicate with another on-duty police officer 306, the secure server 116 does not hide permanent IDs of the police officers 302 and 306 during their communication with each other.

In another scenario, a victim of a crime, police personnel, and medical personnel are all involved in a mixed group session. The victim and police are protected users within the group, while the medical personnel are guest users. In this case, if the victim requires medical assistance, the medical personnel may only see the temporary ID of the victim, thereby limiting the number of people who are aware of the true identity of the victim.

The above scenarios are presented as specific applications employing the claimed invention. It should be appreciated that the claimed invention may be employed under many different applications where anonymity of a protected user is to be preserved. An embodiment of the claimed invention will be described more generally with respect to the flowchart in FIG. 4.

Figure 4:
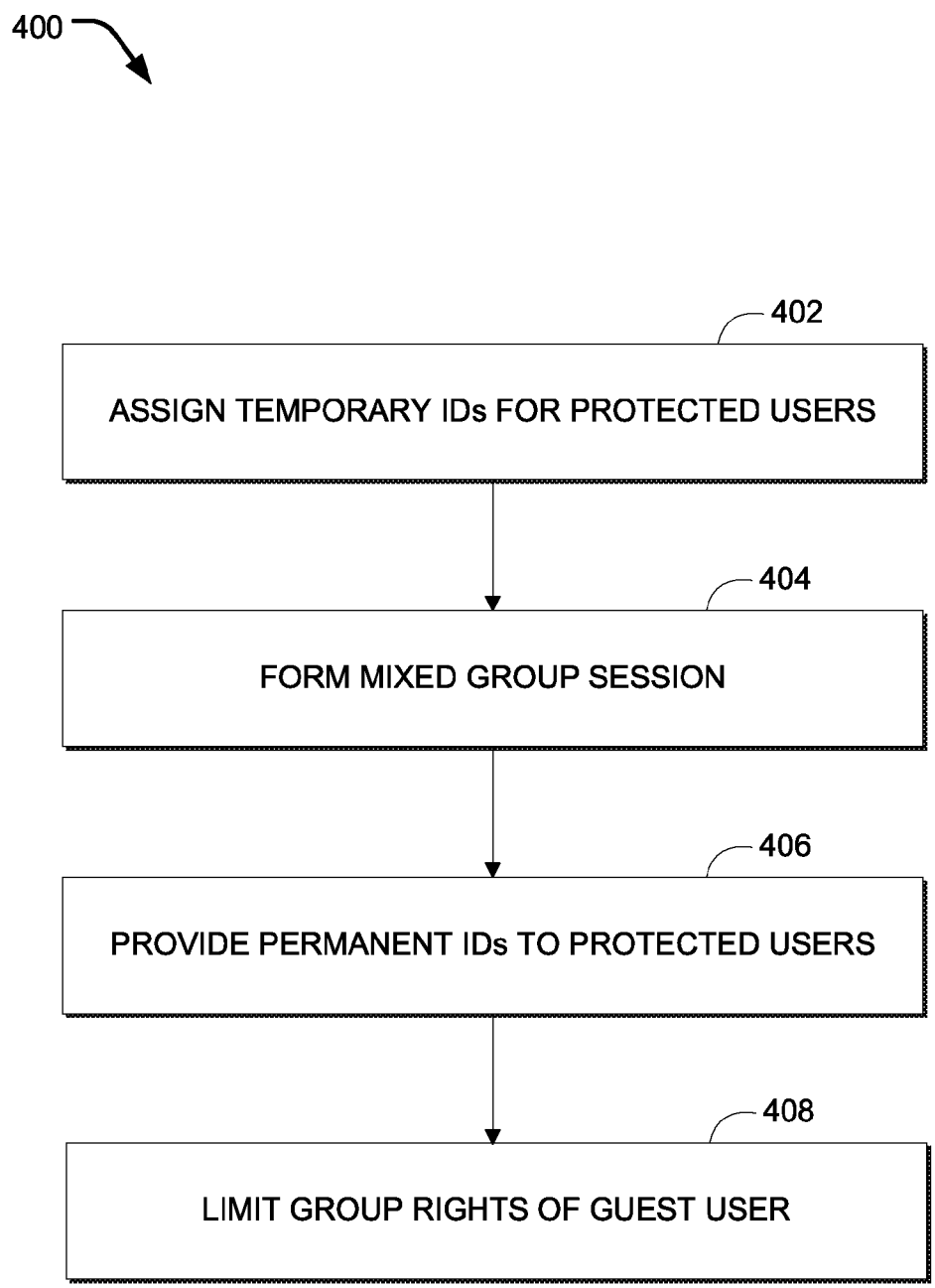
FIG. 4 illustrates a flowchart of an embodiment of a method for providing a mixed group communication session, where identities of protected users are kept anonymous during the mixed group communication session.

FIG. 4 depicts a flowchart 400 of a method for providing a mixed group communication session for a mixed group containing protected users and a guest user. References to the secure server 116 are directed to FIG. 2; further references will not call further attention to that fact, but will presume understanding of the same. At step 402, the secure server 116 assigns temporary IDs to protected users. The assignment may occur on receiving a request from a protected user to setup a mixed group communication session, when requested by a protected user, when a guest user joins the session, or may be present prior to the session being established. The secure server 116 maintains a list of temporary IDs, which are assigned corresponding to permanent IDs of the protected users. The secure server 116 may assign the temporary IDs from sets of temporary IDs that are each established for a particular type of protected user. It will be apparent to one skilled in the art that a protected user may participate in more than one group communication session. For example, an on-duty police officer may be part of a crime investigation team, a highway patrol team, etc. In such cases, the on-duty police officer may be part of more than one communication group.

Then, at step 404, the secure server 116 forms a mixed group session that includes the mixed group containing the protected users and the guest user. It is apparent that the secure server 116 may form more than one mixed group communication sessions for a protected user. The secure server 116 may assign different temporary IDs to a protected user depending on the number and type of group sessions of which the protected user is a part.

Thereafter, the secure server 116 provides permanent IDs of the protected users in the mixed group session to the protected users at step 406. The secure server 116, in one embodiment, provides only temporary IDs of the protected users to the guest user and an OMA PoC server local to the guest user. The secure server 116 in another embodiment may provide at least some of the permanent IDs of the protected users to the guest user during the mixed group session according to the usage rules.

At step 408, the secure server 116 limits rights of the guest user to participate in the mixed group communication session. By limiting the rights of the guest user, the secure server 116 ensures that the decision of which one of the temporary or permanent ID of each protected user is provided to the guest user is independent of preferences of the guest user. The group right limitations may be set by a protected user who initiated the group session, a leader of the group session, or a protected user, if any, who invited the guest user. The group right limitations may also be preset by a system administrator based on predefined criteria. It is envisioned that the protected party or device wishing to maintain anonymity may be able to dynamically set the timeout conditions of the temporary ID assignment services requested to enable or disable use of the service to the guest user. The group right limitations may be set according to factors, such as a default setting of the secure server 116, configuration of the mixed group participating in the mixed group communication session. The secure server 116 establishes the expiration rules 216 priorities to determine which expiration rules are to be used if any of the factors deciding the group right limitations conflict.

In an embodiment of the claimed invention, the temporary IDs assigned to the protected users are valid for a specified period of time. Once the specified period of time elapses, the secure server 116 removes mappings between temporary IDs and permanent IDs according to the expiration rules 216. In another embodiment, expiration of the temporary ID of at least one of the protected users in the mixed group session is independent of termination of the mixed group session. Even after a mixed group session has been terminated, the secure server 116 permits the at least one of the protected users or the guest user to initiate a subsequent session with the at least one of the protected users. To achieve the subsequent session, the secure server 116 maintains a group session history of a mixed group session after a mixed group session has expired. The group session history comprises details, such as which of the temporary ID or permanent ID of each protected user has been provided to the guest user as well as the expiration rules for the mixed group session. This permits contact between the guest user and at least one of the protected users to be re-established using the appropriate ID provided to the guest user.

In one embodiment, durations of the temporary IDs of the protected users are dependent on closure of a ticket generated corresponding to an incident. For example, duration of a temporary ID assigned to a police officer or a team investigating a case (incident) may remain valid for the time taken to close the case. Some incidents may take weeks, months, or years to be closed, and in those incidents it may be desirable for the mappings between temporary IDs and permanent IDs to last as long as the ticket remains open. As soon as the ticket is closed, the mappings between temporary IDs and permanent IDs, which were created for the incident, also expire. In another scenario, duration of the temporary ID of at least one of the protected users may depend on a shift change, when the shift of at least one of the protected users ends. For example, the shift of a police officer investigating a case may end, at which time the temporary ID assigned to the police officer may change. In that case, the secure server 116 assigns the same or a new temporary ID to a police officer joining in place of the earlier police officer.

In an embodiment of the claimed invention, a mixed group session has a permanent group ID. The secure server 116 assigns a temporary group ID to the mixed group session corresponding to the permanent ID of the mixed group session. Further, the secure server 116 provides the temporary group ID rather than the permanent group ID to the guest user.

In one scenario it may be desirable to keep the IDs of all participating members in a mixed group communication session anonymous. For example, an on-duty police officer may wish to communicate with a guest user, who is a key witness of a crime. In that case, it may be desirable to keep IDs of both the permanent user and the guest user anonymous.

Figure 5:
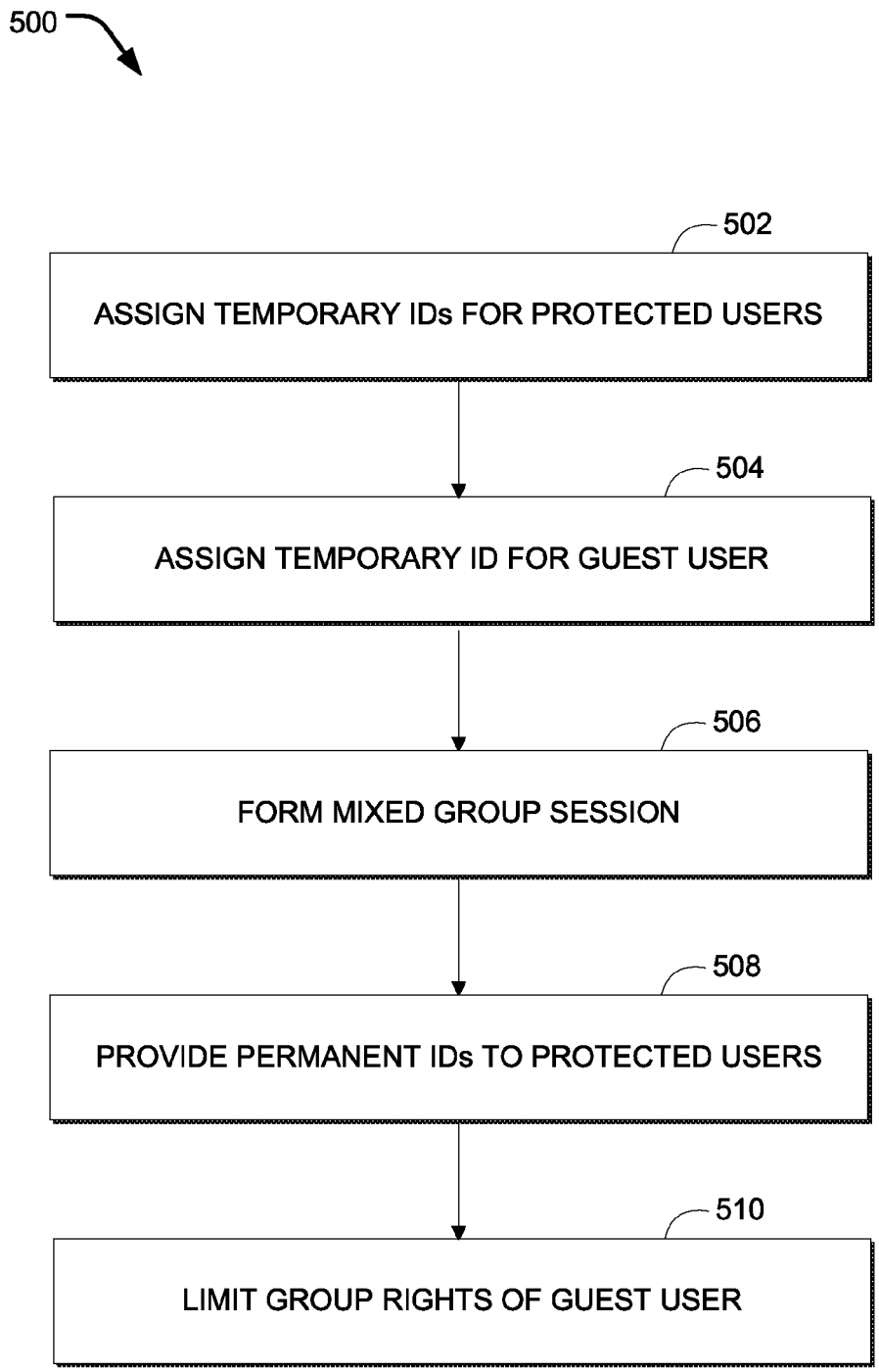
FIG. 5 illustrates a flowchart of an embodiment of a method for providing a mixed group communication session, where identities of both protected users and guest users are kept anonymous.

That contingency is addressed in FIG. 5 that sets out a flowchart 500 of a method of establishing a mixed group communication session for a mixed group containing protected users and a guest user, wherein all IDs are secured. At step 502, the secure server 116 assigns temporary IDs to protected users corresponding to their permanent IDs. At step 504, the secure server 116 assigns temporary IDs to the guest user. The temporary ID of the guest user is different from permanent ID of the guest user. Further, the secure server 116 establishes duration of the temporary ID of the guest user based on the expiration rules 216 that are independent of preferences of the guest user.

Thereafter, the secure server 116 forms a mixed group session that includes the mixed group containing the protected users and the guest user at step 506. In the mixed group session, the secure server 116 uses temporary IDs of the protected user and the guest user during communication towards each other. The secure server 116 may also provide multiple mixed group sessions containing at least one of a common protected user or a common guest user. Further, the secure server 116 assigns different temporary IDs between the mixed group sessions for the at least one of the common protected users or the common guest user. The mixed group may contain more than one guest user having temporary IDs assigned corresponding to their permanent IDs. Further, the secure server 116 may provide the guest users with permanent IDs of at least one of the protected users or at least one of the other guest users according to the usage rules.

At step 508, the secure server 116 provides permanent IDs of the protected users in the mixed group session to the protected users. Thereafter, at step 510, the secure server 116 limits rights of the guest users to participate in the mixed group communication session, and thus ensures that the decision of which one of the temporary or permanent ID of each protected user is provided to the guest user is independent of preferences of the guest user.

Another scenario that may occur is where a guest user may wish to re-communicate to a protected user after a mixed group session has expired. For example, consider a scenario where an on-duty police officer directs medical personnel to an accident site. Upon reaching the accident site the medical personnel may need to setup a call back session with the on-duty police officer. The call back session may be a 1-to-1 or ad hoc group session (if more than just the police officer is involved).

Figure 6:
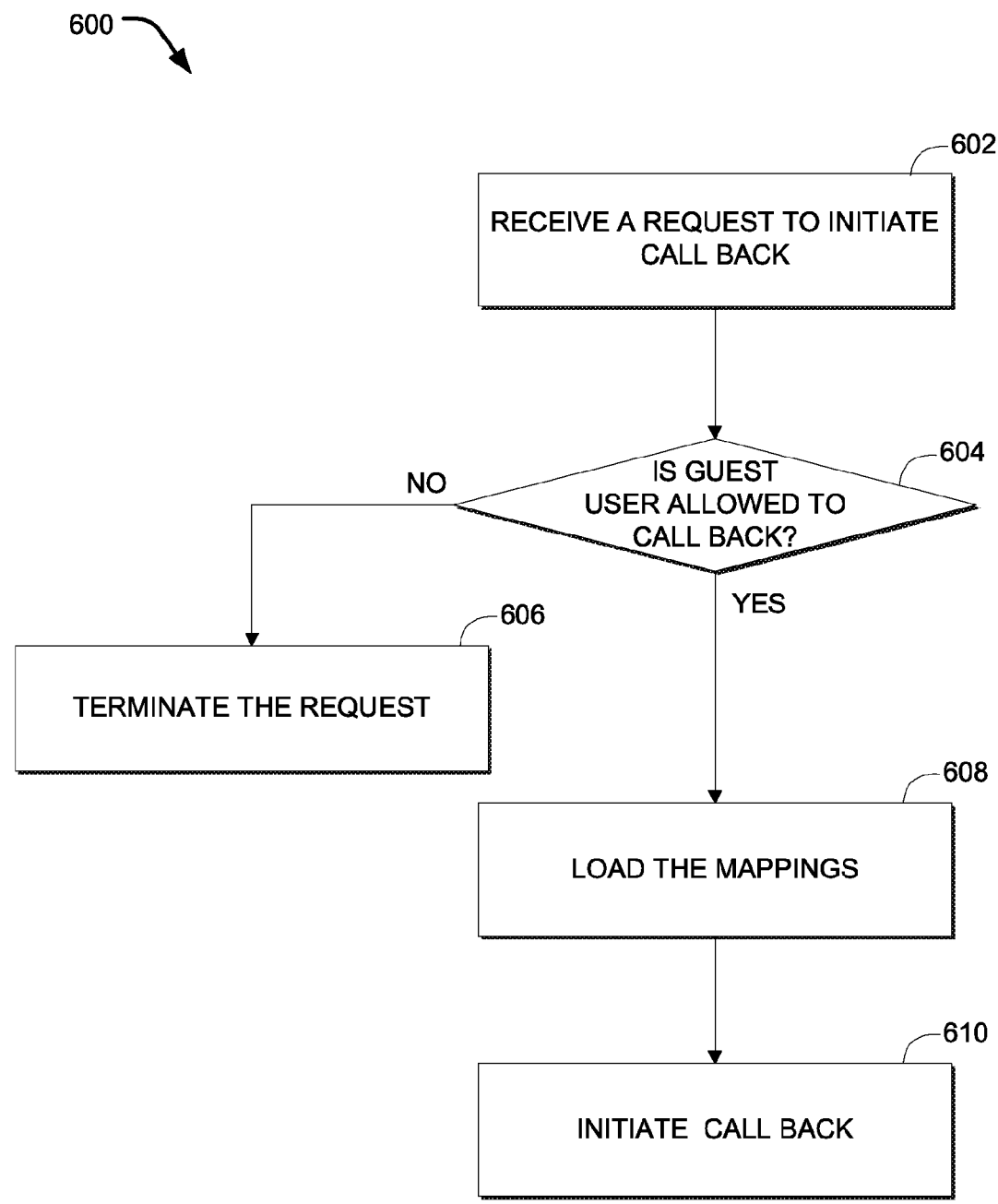
FIG. 6 illustrates a flowchart of an embodiment of a method for providing a mixed group communication session, where a guest user wishes to have a call back session with one or more protected users.

A method for establishing a call back session among a protected user and a guest user, after a mixed group session containing the protected user and the guest user has expired, is depicted in FIG. 6. At step 602, the secure server 116 receives a request from the guest user to setup a call back session. At step 604, the secure server 116 checks for group rights of the guest user and determines whether the guest user is allowed to initiate a call back session. The secure server 116 checks the group session history of the mixed group and determines parameters required to setup the call back session, such as the temporary ID or permanent ID of each protected user which has been earlier provided to the guest user.

If the guest user does not have the group rights to initiate the call back session, the secure server 116 terminates the request at step 606. If the guest user does have the group rights to initiate the call back session, the secure server 116 loads mappings corresponding to the relationships between different temporary IDs and permanent IDs at step 608. Upon receiving the request from the guest user to invite one or more protected users with temporary ID or temporary group ID, the secure server 116 checks if the mapping for the temporary IDs exists and whether the guest user has been previously provided with the associated protected user's or protected group's temporary ID. If so, the secure server 116 replaces each temporary ID with the protected user's permanent ID or protected group's permanent ID and continues processing of the request. Thereafter, at step 610, the secure server 116 forms a call back session among the guest user and the protected user. The call back session may include more than one guest user and protected user.

For ad hoc group calls, if at least one of the requested protected user's IDs has a valid mapping, the secure server 116 can continue processing on the call back session for targets with valid mappings, while rejecting attempts to the invalid/expired temporary IDs. If none of the mappings exist or the guest user has not been provided with the protected user's temporary ID, the secure server 116 rejects the request with a specified response. For example, in case of a limited access communication network using SIP URIs it may be SIP 4xx (for example, SIP 403 "Forbidden").

In one embodiment, the protected user can configure duration of the call back session and terminates the call back session when a specific incident is over. It can be done by, for example, sending a Publish Request to the secure server 116 with a specific setting.

Note that though an IMS is illustrated in the figures, the IMS may not be present in other embodiments. In such embodiments, the OMA PoC server is directly connected to the broadband access network and to other PTT systems or is connected to the broadband access network and to other PTT systems via a SIP Core cloud. The Secure-S-CSCF may also not be present in such embodiments. In fact, in other embodiments, the Secure-S-CSCF may not be present even if the IMS is present.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. In particular, although the description herein has focussed on PS specific applications due to the unique challenges of such a system, the embodiments presented is applicable to a wide variety of communication systems in which controllable privacy of some of the members is desirable. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed. The Abstract of this disclosure is provided to comply with 37 C.F.R. §1.72(b), which requires an abstract that will enable a reader to quickly ascertain the nature of the technical disclosure. It is submitted with the understanding that it will not be used to interpret or limit the scope or meaning of the claims. In addition, it can be seen in the foregoing Detailed Description that various features are grouped together in a single embodiment, for the purpose of streamlining the disclosure. This method of disclosure should not be interpreted as reflecting an intention that the claimed embodiments require more features than are expressly recited in each claim. On the contrary, as the following claims reflect, the inventive subject matter lies in less than all the features of a single disclosed embodiment. Thus, the following claims are hereby incorporated into the Detailed Description, with each claim standing on its own as a separately claimed subject matter.

What is claimed is:

1. A method of providing a mixed group communication session for a mixed group containing protected users and at least one guest user, the method comprising:
    assigning by a server, temporary identities (IDs) to each of the protected users at the server, wherein each of the temporary IDs is mapped to permanent IDs of the protected users;
    forming by the server, a mixed group session that includes the mixed group;
    providing by the server, the permanent ID of each of the protected users in the mixed group session to other protected users;
    determining by the server, which one of the temporary or permanent ID of each protected user is to be provided to the at least one guest user during the mixed group session, wherein the determining is independent of preferences of the at least one guest user;
    based on the determining, providing, by the server, the temporary ID of at least one protected user in the mixed group session to the at least one guest user; and
    wherein the method further comprises assigning, by the server, a temporary group ID to the mixed group session, wherein the mixed group session has a permanent group ID, and providing the temporary group ID rather than the permanent group ID to the at least one guest user.

2. The method of claim 1, further comprising, of the permanent IDs and temporary IDs of the protected users, providing by the server, only the temporary IDs of the protected users to the at least one guest user during the mixed group session.

3. The method of claim 1, further comprising, of the permanent IDs and temporary IDs of the protected users, providing by the server, at least some of the permanent IDs of the protected users to the at least one guest user during the mixed group session.

4. The method of claim 1, the method further comprising assigning by the server, a temporary ID for the at least one guest user, the temporary ID of the guest user being different from the permanent ID of the at least one guest user.

5. The method of claim 4, further comprising establishing by the server, a duration of the temporary ID of the at least one guest user based on expiration rules that are independent of preferences of the at least one guest user.

6. The method of claim 1, further comprising assigning the temporary IDs from sets of temporary IDs that are each established for a particular type of protected user, the temporary ID of an individual protected user selected from the set of temporary IDs established for the type of the individual protected user.

7. The method of claim 1, wherein the group right limitations are set by:
a) a default server setting, or
b) a group configuration.

8. The method of claim 7, further comprising establishing by the server, expiration rule priorities to determine which expiration rules are to be used when b) and c) conflict.

9. The method of claim 1, wherein the protected users are served by a limited access communication network.

10. The method of claim 1, wherein expiration of the temporary ID of at least one of the protected users is independent of termination of the mixed group session, the method further comprising, after the mixed group session has been terminated, permitting by the server, the at least one of the protected users or the at least one guest user to initiate a subsequent session with the at least one of the protected users while the temporary ID of the at least one of the protected users at termination is maintained.

11. The method of claim 10, wherein the subsequent session is a 1-to-1 or ad hoc group session.

12. The method of claim 1, wherein durations of the temporary IDs of the protected users are dependent on closure of an incident ticket.

13. The method of claim 1, wherein a duration of the temporary ID of at least one of the protected users is dependent on a shift change ending a shift of the at least one of the protected users.

14. The method of claim 1, further comprising maintaining by the server, a group session history of the mixed group session after the mixed group session has terminated, the group session history comprising which of the temporary ID or permanent ID of each protected user has been provided to the at least one guest user.

15. The method of claim 1, further comprising:
providing by the server, multiple mixed group sessions containing at least one of a common protected user or a common guest user; and assigning by the server, different temporary IDs between the mixed group sessions for the at least one of the common protected user or the common guest user.

16. The method of claim 1, wherein the mixed group contains a plurality of guest users having different permanent and temporary IDs, the method further comprising providing by the server, the guest users with only the temporary IDs of the protected users and of the guest users.

17. The method of claim 1, wherein the mixed group contains a plurality of guest users having different permanent and temporary IDs, the method further comprising providing by the server, the guest users with the permanent ID of at least one of: at least one of the protected users or at least one of the other guest users.

18. The method of claim 1, further comprising:
receiving by the server, a request to allow the at least one guest user to join a group session containing, of the protected users and the at least one guest user, only the protected users;
permitting by the server, the at least one guest user to join the group session to form the mixed group session.

19. The method of claim 2, further comprising:
facilitating, by the server, communication between the protected users and the at least one guest user using the temporary IDs;
facilitating, by the server, communication amongst the protected users using the permanent IDs.

20. The method of claim 3, further comprising:
facilitating, by the server, communication between at least some of the protected users and the at least one guest user using the at least some of permanent IDs.

21. The method of claim 1, wherein forming the mixed group session further comprises, temporarily adding by the server, the at least one guest user to an established secure communication of the protected users.

22. The method of claim 14, further comprising establishing by the server, a call back session among the protected users and the at least one guest user, after the mixed group session has terminated.

23. The method of claim 22, further comprising:
receiving by the server, a request from the at least one guest user to setup the call back session;
determining by the server, whether the at least one guest user has group rights to initiate the call back session; and
when the at least one guest user has group rights to initiate the call back session, forming by the server, the call back session among the protected users and the least one guest user based on the group session history.

24. The method of claim 1, wherein the protected users are permanent members of a secure communication group, and further wherein the at least one guest user is not a permanent member of the secure communication group.

25. The method of claim 1, wherein assigning by the server, is in response to receiving a request from a protected user, by the server, to setup a mixed group communication session, when requested by the protected user, when a guest user joins the mixed group communication session, or is present prior to the mixed group communication session being established.

* * * * *

UNITED STATES PATENT AND TRADEMARK OFFICE
CERTIFICATE OF CORRECTION

PATENT NO. : 9,021,561 B2
APPLICATION NO. : 12/212140
DATED : April 28, 2015
INVENTOR(S) : Anatoly Agulnik et al.

It is certified that error appears in the above-identified patent and that said Letters Patent is hereby corrected as shown below:

IN THE TITLE PAGE:

In Item (75), under "Inventors," in Column 1, Line 3, delete "A" and insert -- A. --, therefor.

IN THE SPECIFICATION:

In Column 5, Line 41, delete "protected user 302" and insert -- protected user 112 --, therefor.

In Column 5, Line 43, delete "protected user 302" and insert -- protected user 114 --, therefor.

IN THE CLAIMS:

In Claim 8, Column 11, Line 29, delete "when b) and c)" and insert -- when a) and b) --, therefor.

Signed and Sealed this
Twenty-eighth Day of June, 2016

Michelle K. Lee
*Director of the United States Patent and Trademark Office*